United States Patent
Lee et al.

(10) Patent No.: US 9,336,562 B2
(45) Date of Patent: May 10, 2016

(54) METHOD OF COMPRESSING AND RECOVERING COMPRESSED DATA BASED ON DETECTING A MAXIMUM AND MINIMUM DATA CELL VALUE

(71) Applicant: SAMSUNG DISPLAY CO., LTD., Yongin, Gyeonggi-Do (KR)

(72) Inventors: Ji-Gong Lee, Yongin (KR); Jin-Woo Park, Yongin (KR); Sang-Kwon Ha, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 271 days.

(21) Appl. No.: 14/061,108

(22) Filed: Oct. 23, 2013

(65) Prior Publication Data

US 2014/0347381 A1 Nov. 27, 2014

(30) Foreign Application Priority Data

May 23, 2013 (KR) ........................ 10-2013-0058556

(51) Int. Cl.
*G06T 9/00* (2006.01)
*G06T 1/60* (2006.01)

(52) U.S. Cl.
CPC .... *G06T 1/60* (2013.01); *G06T 9/00* (2013.01)

(58) Field of Classification Search
None
See application file for complete search history.

(56) References Cited

U.S. PATENT DOCUMENTS

| 2001/0022851 A1* | 9/2001 | Nagai et al. ................. 382/162 |
| 2001/0036305 A1* | 11/2001 | Jun ............................ 382/149 |
| 2010/0074543 A1* | 3/2010 | Torai ........................... 382/239 |
| 2010/0315406 A1* | 12/2010 | Nose et al. ................... 345/212 |
| 2013/0294706 A1* | 11/2013 | Maurer et al. ............... 382/251 |

FOREIGN PATENT DOCUMENTS

| JP | 2011-172153 | 9/2011 |
| KR | 1020040016604 | 2/2004 |
| KR | 1020070115049 | 12/2007 |

* cited by examiner

*Primary Examiner* — Zhengxi Liu
*Assistant Examiner* — Ryan M Gray
(74) *Attorney, Agent, or Firm* — F. Chau & Associates, LLC (57) ABSTRACT

A data processing method that includes: detecting a maximum data cell having a maximum value and a minimum data cell having a minimum value in a compression unit cell; converting the maximum data cell and the minimum data cell into a non-compressed data format; converting remaining data cells of the compression unit cell except for the maximum and minimum data cells into a compressed data format; and generating stream data in which the converted data cells are arranged, wherein the non-compressed data format and the compressed data format include a header field with different values and the non-compressed data format includes a data field corresponding to the value of the converted maximum or minimum data cell.

16 Claims, 11 Drawing Sheets

| | 110 | 112 | 114 | 118 | | |
|---|---|---|---|---|---|---|
| | | 12 | 13 | 5 | 10 | ... |
| 116 | | 15 | 24 | 10 | 20 | ... |
| | | 0 | 4 | 4 | 4 | ... |
| | | 40 | 48 | 44 | 48 | ... |
| | | ⋮ | ⋮ | ⋮ | ⋮ | ⋱ |

8 (columns), 8 (rows)

14bit
10000100100011

| 00001100 | 00001101 | 00000101 | 00001010 | ... |
| 00001111 | 00011000 | 00001010 | 00010100 | ... |
| 00000000 | 00000100 | 00000100 | 00000100 | ... |
| 00101000 | 00110000 | 00101100 | 00110000 | ... |
| ⋮ | ⋮ | ⋮ | ⋮ | ⋮ |

(A)

| | MAX_1 | MAX_2 | MAX_3 | MAX_4 |
|---|---|---|---|---|
| 122 | 00110000 | 00110000 | 00101100 | 00101000 |
| | MIN_1 | MIN_2 | MIN_3 | MIN_4 |
| 124 | 00000000 | 00000100 | 00000100 | 00000100 |

(B)

120 ↘

| 0 | 0 | 0 | 0 |
| 0 | 0 | 0 | 0 |
| 1000000 | 1000001 | 1000001 | 1000001 | —124
| 1001010 | 1001100 | 1001011 | 1001100 | —122

(C)

64bit
0000000010000001000011000001100000110010101001100100101110 0110

| 00001100 | 00001101 | 00000101 | 00001010 | ... |
| 00001111 | 00011000 | 00001010 | 00010100 | ... |
| 00000000 | 00000100 | 00000100 | 00000100 | ... |
| 00101000 | 00110000 | 00101100 | 00110000 | ... |

130

(A)

102

| 00001100 | 00001101 | 00000101 | 00001010 | ... |
| 00001111 | 00011000 | 00001010 | 00010100 | ... |
| 00000000 | 00000100 | 00000100 | 00000100 | ... |
| 00101000 | 00110000 | 00101100 | 00110000 | ... |

METHOD OF COMPRESSING AND RECOVERING COMPRESSED DATA BASED ON DETECTING A MAXIMUM AND MINIMUM DATA CELL VALUE

CROSS-REFERENCE TO RELATED APPLICATION

This application claims priority under 35 U.S.C. §119 to Korean Patent Application No. 10-2013-0058556 filed in the Korean Intellectual Property Office on May 23, 2013, the disclosure of which is incorporated by reference herein in its entirety.

TECHNICAL FIELD

The present invention relates to a data processing method and a display device using the same. More particularly, the present invention relates to a data processing method of compressing data and recovering the compressed data, and a display device using the same.

DISCUSSION OF THE RELATED ART

To efficiently use a data recording capacity of a recording medium and to easily transmit and receive the data, in many electronic devices, a data processing technique of compressing the data and recovering the compressed data is used.

In a data processing method of compressing data with a high compression ratio, the compression process is complicated, and the processing speed is slow, for example. In a data processing method of compressing data with a low compression ratio, the processing speed is fast, and the compression process is relatively simple, for example.

An active matrix organic light emitting diode display (AMOLED) is a display device in which light is selectively emitted for each unit pixel.

In a pixel of the AMOLED (hereinafter referred to as an organic light emitting diode display), an emission degree of an organic light emitting diode (OLED) is controlled by controlling a driving transistor which supplies a driving current according to a data voltage provided to the OLED.

The OLED may deteriorate due to the emission of light over time. The deteriorated OLED may have decreased luminance in comparison with a non-deteriorated OLED. For example, after the OLED emits light for about 50,000 hours, it may have a luminance of about 37% compared with its beginning luminance. If the OLED is deteriorated, an image with lesser luminance is displayed.

SUMMARY

Exemplary embodiments of the present invention provide a data processing method that increases a compression ratio and reduces hardware complexity and processing time when compressing data.

Exemplary embodiments of the present invention provide a display device for displaying images of uniform luminance even when a pixel is deteriorated.

A data processing method according to an exemplary embodiment of the present invention includes: detecting a maximum data cell having a maximum value and a minimum data cell having a minimum value in a compression unit cell; converting the maximum data cell and the minimum data cell into a non-compressed data format; converting remaining data cells of the compression unit cell except for the maximum and minimum data cells into a compressed data format; and generating stream data in which the converted data cells are arranged, wherein the non-compressed data format and the compressed data format include a header field with different values and the non-compressed data format includes a data field corresponding to the value of the converted maximum or minimum data cell.

The data processing method may further include: detecting a first header field from the stream data; determining a value of the first header field; deducting from a first data field if the value of the first header field corresponds to the non-compressed data format; recovering the value of the deducted first data field; and arranging the recovered value according to a detection order of the first header field.

The data processing method may further include: arranging the value of the first header field according to the detection order of the first header field if the value of the first header field corresponds to the compressed data format; and recovering the arranged first header field by using the recovered value.

The compression unit cell may include a plurality of data cells arranged in a p×q shape.

The p may be determined according to a distribution of a plurality of data values in original data.

The p may be determined according to a line number of a memory storing the stream data.

The non-compressed data format may include fewer bits than the maximum or minimum data cells before they are converted.

A display device according to an exemplary embodiment of the present invention includes: a display unit including a plurality of pixels configured to emit light according to a plurality of data signals; a data driver configured to transmit the data signals through a plurality of data lines connected to the plurality of pixels; a power source voltage supply unit configured to supply a driving voltage to drive the plurality of pixels through a power source wire connected to the plurality of pixels; a compensation memory unit configured to store each compensation data of the plurality of pixels and output the compensation data as stream data; and a controller configured to generate an image data signal by using a received video signal, detect a header field from the stream data, determine a value of the header field, recover a maximum value and a minimum value of the stream data according to the value of the header field, recover middle stream data by using the maximum value and the minimum value, and compensate the image data signal by using the maximum value, the minimum value, or the recovered middle stream data.

The controller may deduct a data field of the stream data if the value of the header field corresponds to a non-compressed data format, recover the deducted value of the data field as the maximum value or the minimum value, and arrange the recovered value of the data field according to a detection order of the header field.

The controller may arrange the value of the header field according to a detection order of the header field if the value of the header field corresponds to a compressed data format.

The controller may recover the middle stream data as a middle value of the maximum value and the minimum value or an average value of the maximum value and the minimum value.

The display device may further include a memory unit configured to store the maximum value, the minimum value, or the recovered middle stream data.

Original data may be compressed into the stream data by using a compression unit cell in which a plurality of data cells formed of a plurality of bits are arranged in a shape.

The plurality of data cells may be arranged in a p×q shape. The p may be determined according to a distribution of data values of the original data. The p may be determined according to a line number of a memory unit connected with the controller. A non-compressed data format of the maximum and minimum values may include fewer bits than the maximum and minimum values before they are converted.

A data processing method according to an exemplary embodiment of the present invention includes: detecting, from a plurality of data cells, a first data cell having a first value and a second data cell having a second value, wherein values of remaining data cells of the plurality of data cells fall between the first and second values; converting the first and second data cells into a non-compressed data format; converting the remaining data cells into a compressed data format; and generating stream data that includes the converted first and second data cells and the converted remaining data cells.

The non-compressed data format may include a header field and a data field for each of the first and second data cells.

The compressed data format may include a header field for each of the converted remaining data cells.

DETAILED DESCRIPTION OF THE EMBODIMENTS

Exemplary embodiments of the present invention will be described more fully hereinafter with reference to the accompanying drawings. However, the present invention may be modified in various different ways and should not be construed as limited to the embodiments disclosed herein.

Like reference numerals may designate like elements throughout the specification.

It will be understood that when an element is referred to as being "coupled" to another element, the element may be "directly coupled" to the other element or intervening elements may be present.

Figure 1:
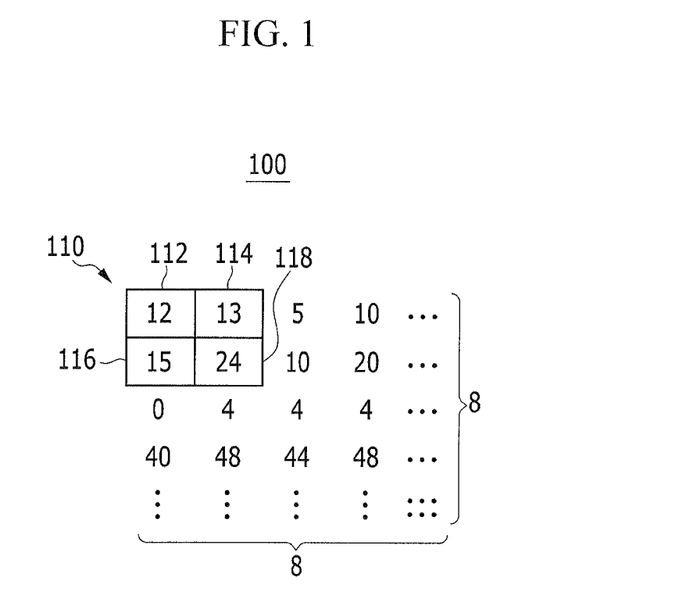
FIG. 1 is a diagram showing an example of original data that is processed by a data processing method according to an exemplary embodiment of the present invention.

FIG. 1 is a diagram showing an example of original data 100 that is processed by a data processing method according to an exemplary embodiment of the present invention. As shown in FIG. 1, the original data 100 may include a plurality of data. For better understanding and ease of description, a plurality of data are represented as a decimal, however the present invention is not limited thereto.

In addition, each data may correspond to each element of a matrix. For example, when the original data 100 includes information that may be arranged in an 8×8 matrix, each data may include information corresponding to each element of the matrix. Hereinafter, for better understanding and ease of description, it is assumed that a plurality of data are arranged in the 8×8 matrix form.

The original data 100 arranged in the matrix form may be compressed with a compression unit cell 110. The compression unit cell 110 as a unit to compress the original data 100 may include a plurality of data cells.

Each data cell may include data of the original data 100. For example, the first data cell 112 may include 12, the second data cell 114 may include 13, the third data cell 116 may include 15, and the fourth data cell 118 may include 24.

In addition, a plurality of data cells may be arranged in a matrix. For example, a plurality of data cells may be arranged in a 2×2 matrix.

The arrangement of a plurality of data cells in the compression unit cell 110 may be determined according to a distribution of a plurality of data values of the original data 100. For example, if the compression unit cell 110 includes four data cells, a plurality of data cells may be arranged in a 2×2, 1×4, or 4×1 matrix. This will be described with reference to FIG. 6.

In addition, the arrangement of a plurality of data cells in the compression unit cell 110 may be determined according to a number of memories used when recovering and storing the compressed data. This will be described with reference to FIG. 11.

The original data 100 included in the compression unit cell 110 may be compressed with stream data. For example, a plurality of data 12, 13, 15, and 24 included in a plurality of data cells may be compressed with the stream data.

An exemplary embodiment of the present invention provides a data processing method for increasing the compression ratio of the stream data and reducing an error between a maximum value and a minimum value of the data recovering the stream data, and a maximum value and a minimum value of the original data 100.

Next, referring to FIG. 2, a method of compressing the original data 100 into the stream data by using the compression unit cell 110 will be described.

Figure 2:
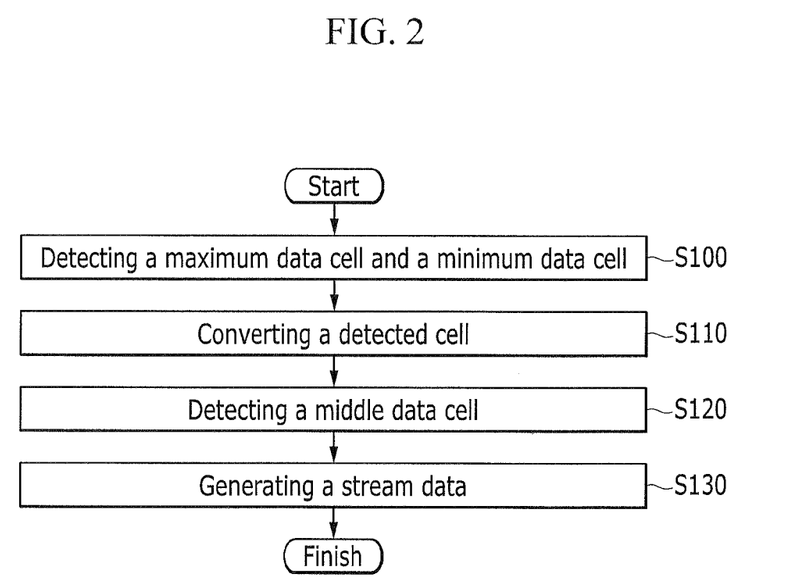
FIG. 2 is a flowchart showing a process of compressing data by a data processing method according to an exemplary embodiment of the present invention.

FIG. 2 is a flowchart showing a process of compressing data by a data processing method according to an exemplary embodiment of the present invention. The compression of the original data 100 according to the data processing method may be performed in a recording medium that may be read through a computer or a device similar thereto by using software, hardware, or a combination thereof.

According to a hardware case, the above-described exemplary embodiment may be performed by using application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electrical units performing other functions, for example. In other cases, the exemplary embodiments described in the present specification may be performed by using a controller. Hereinafter, it is assumed that the controller compresses the original data 100.

With reference to FIG. 2, the controller detects a maximum data cell 118 having the maximum value and a minimum data cell 112 having the minimum value in the compression unit cell 110 (S100). For example, when the compression unit cell 110 has the 2×2 shape, the controller may detect the data cell 118 having the maximum value (e.g., 24) and the data cell 112 having the minimum value (e.g., 12)) among a total of four data cells 112, 114, 116, and 118.

In addition, when the compression unit cell has the 8×8 shape, the controller may detect 16 maximum data cells and 16 minimum data cells among a total of 64 data cells. A number of maximum data cells and a number of minimum data cells may be changed according to the compression ratio and will be described with reference to FIG. 5.

Next, the controller converts the detected data cells 112 and 118 into a non-compressed data format (S110). The non-compressed data format may include a header field or a data field.

The header field may include a flag value that the converted data uses to identify the maximum data or the minimum data, and the data field may include a value into which the data cell is converted.

The controller detects data cells excluding the maximum data cell 118 and the minimum data cell 112 (S120). Hereinafter, the data cells excluding the maximum data cell 118 and the minimum data cell 112 are described as middle data cells.

In addition, the controller may convert the detected middle data cells 114 and 116 into the compressed data format. The compressed data format may include a header field. The header field of the non-compressed data format and the header field of the compressed data format may have different values.

Next, the controller generates the stream data by arranging the converted data (S130). The controller may arrange the converted data to correspond to the arrangement of each data in the original data 100.

Next, referring to FIG. 3 to FIG. 5, a process of compressing the original data 100 will be described.

Figure 3:
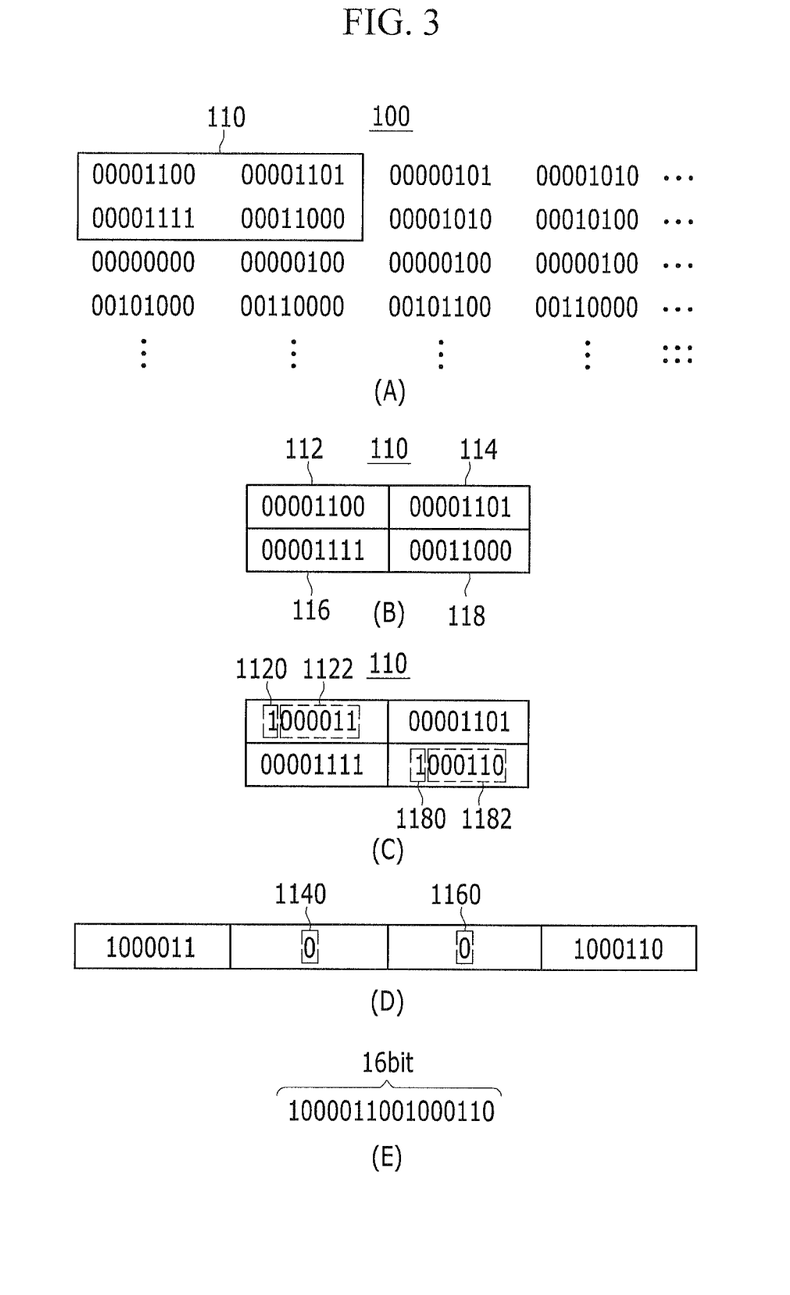
FIG. 3 to FIG. 5 are diagrams showing data compressed by a data processing method according to an exemplary embodiment of the present invention.
Figure 4:
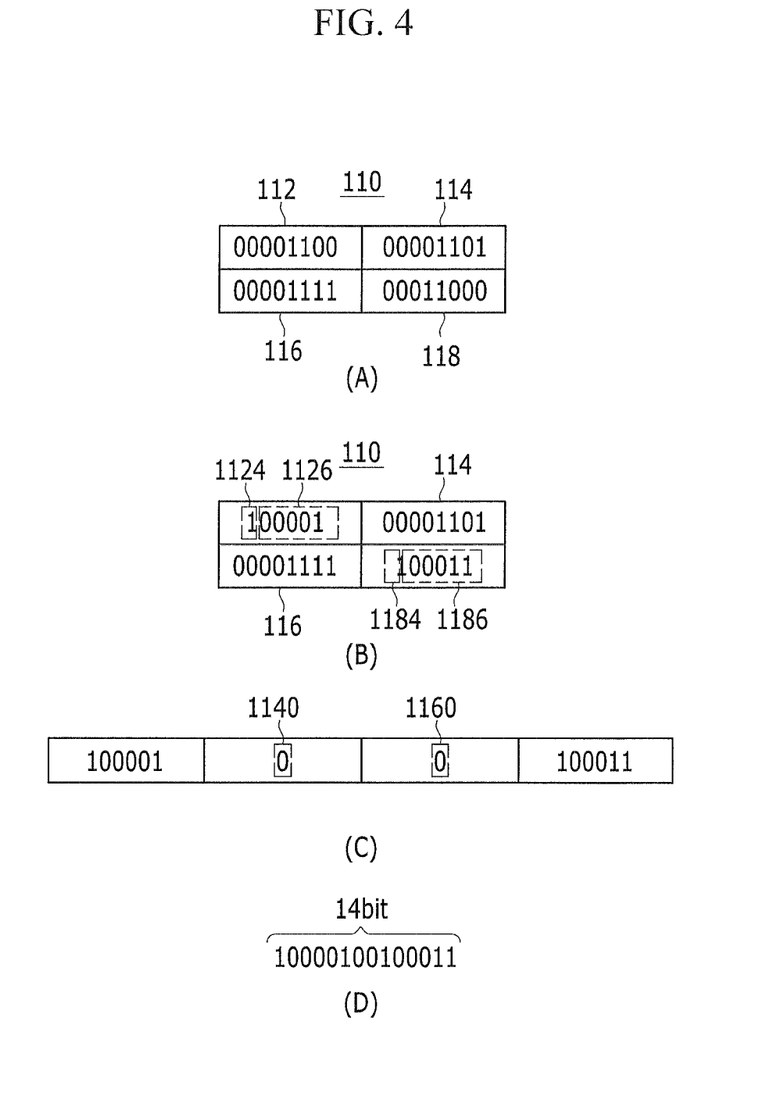
Figure 5:
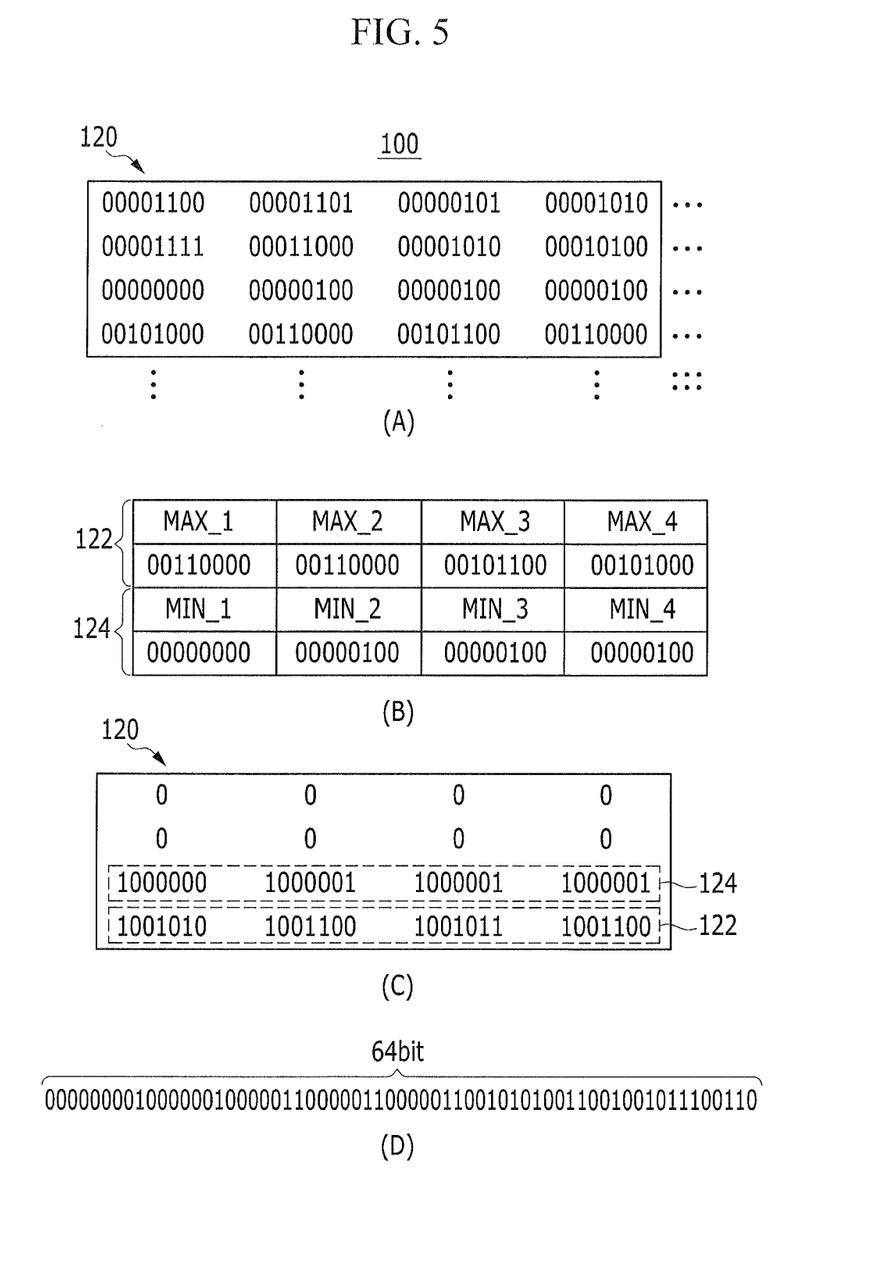

FIG. 3 to FIG. 5 are diagrams showing data compressed by a data processing method according to an exemplary embodiment of the present invention. First, as shown in FIG. 3 (A), the original data 100 consists of units of 8 bits and may be arranged in a matrix. In addition, the compression unit cell 110 includes four data cells arranged in a 2×2 matrix, and each data cell may include the data to be compressed.

As shown in FIG. 3 (B), the first data cell to the fourth data cell 112, 114, 116, and 118 respectively include the original data 100, and the controller may detect the maximum data cell and the minimum data cell in the compression unit cell 110.

If the fourth data cell 118 is determined to be the maximum data cell and the first data cell 112 is determined to be the minimum data cell, as shown in FIG. 3 (C), the controller may convert the maximum data cell 118 and the minimum data cell 112 into the non-compressed data format.

In an example of the minimum data cell, the controller inserts flag information 1 into a header field 1120 corresponding to the first data cell. In addition, the controller inserts a value that discards the lower 2 bits of the first data cell value into a data field 1122 corresponding to the first data cell. In other words, the original value of the first data cell 112 is 00001100, the header field 1120 corresponding thereto is converted into 1, and the data field 1122 is converted into 000011.

Likewise, the original value of the fourth data cell 118 is 00011000, a header field 1180 corresponding to the fourth data cell 118 is converted into 1, and a data field 1182 is converted into 000110.

In addition, as shown in FIG. 3 (D), the controller may respectively insert the flag information 0 into header fields 1140 and 1160 corresponding to the remaining data cells 114 and 116. In other words, the rest of the data cells receive the flag information 0 except for the maximum data cell and the minimum data cell.

Next, as shown in FIG. 3 (E), the controller may arrange the header field and the data field that are converted according to the arrangement order in the compression unit cell 110 to generate the stream data of 16 bits.

Since the compression unit cell 110 includes four original data 100 of 8 bits each, the compression unit cell 110 has a capacity of a total of 32 bits, however the compressed stream data has a capacity of 16 bits for a 50% compression ratio for the original data 100 included in the compression unit cell 110.

Further, the controller may reduce the size of the data field of the non-compressed data format to increase the compression ratio. This will be described with reference to FIG. 4.

As shown in FIG. 4 (A) and FIG. 4 (B), the controller detects the maximum data cell 118 and the minimum data cell 112 and converts them into the header fields 1124 and 1184 and the data fields 1126 and 1186 having the flag information 1.

The controller may reduce the size of the data fields 1126 and 1186. For example, the controller inserts a value that discards the lower 3 bits of the value of the first data cell 112 into the data field 1126 corresponding to the first data cell. At this time, the data field 1126 may have a total of 5 bits.

Accordingly, the header field 1124 corresponding to the first data cell 112 may be converted into 1, the data field 1126 may be converted into 00001, the header field 1184 corresponding to the fourth data cell 118 may be converted into 1, and the data field 1186 may be converted into 00011.

In addition, as shown in FIG. 4 (C), the controller may insert the flag information 0 into the header fields 1140 and 1160 corresponding to the second data cell 114 and the third data cell 116 that are the middle data cells.

Thus, as shown in FIG. 4 (D), the controller arranges the header field and the data field that are converted according to the arrangement order in the compression unit cell 110 to generate the stream data of 14 bits. If the size of the data field is decreased, the stream data may be compressed with a compression ratio of about 66% for the original data 100 included in the compression unit cell 110.

Next, referring to FIG. 5, a process of generating the stream data by detecting a plurality of maximum data cells and a plurality of minimum data cells will be described.

As shown in FIG. 5 (A), a plurality of data cells of a compression unit cell 120 may be arranged in a 4×4 matrix. The controller may detect a plurality of upper data cells including the maximum data cell and a plurality of lower data cells including the minimum data cell among the 16 data cells.

For example, as shown in FIG. 5 (B), the controller sequentially detects 00110000, 00110000, 00101100, and 00101000 of large values as an upper data cell 122, and sequentially detects 00000000, 00000100, 00000100, and 00000100 of small values as a lower data cell 124.

In addition, the controller may convert the detected upper data cell 122 and lower data cell 124 into the non-compressed data format and the data cell except for the upper data cell 122 and the lower data cell 124 into the compressed data format.

As an example, the controller may insert flag information 1 into the header field of a large value of the upper data cell 122 and insert a value that does not include the lower 2 bits of the upper data cell 122 into the large value.

As shown in FIG. 5 (C), the upper data cell 122 including 00110000 may be converted into the header field 1 and the data field 001100, the upper data cell 122 including 00101100 may be converted into the header field 1 and the data field 001011, and the upper data cell 122 including 00101000 may be converted into the header field 1 and the data field 001010.

The lower data cell 124 including 00000000 may be converted into the header field 1 and the data field 000000, and the lower data cell 124 including 00000100 may be converted into the header field 1 and the data field 000001.

In addition, as shown in FIG. 5 (D), the controller arranges the header field and the data field that are converted according to the arrangement order in the compression unit cell 120 to generate the stream data of 64 bits.

Since the compression unit cell 120 includes the 16 original data 100 made of 8 bits each, the compression unit cell 120 has a total capacity of 128 bits, however the compressed stream data has the 64 bit capacity that is a compression ratio of 50% for the original data 100 included in the compression unit cell 120.

According to the compression ratio, the controller may determine the number of the detected upper data cells 122 and lower data cells 124 and the size of the data field. For example, to increase the compression ratio, the controller may reduce the number of upper data cells 122 and lower data cells 124. This is because the size of the stream data is reduced if the number of data cells compressed by the compressed data format is increased.

Next, referring to FIG. 6, the arrangement of the data cells in the compression unit cell that is changed according to the distribution of a plurality of data values of original data 102 will be described.

Figure 6:
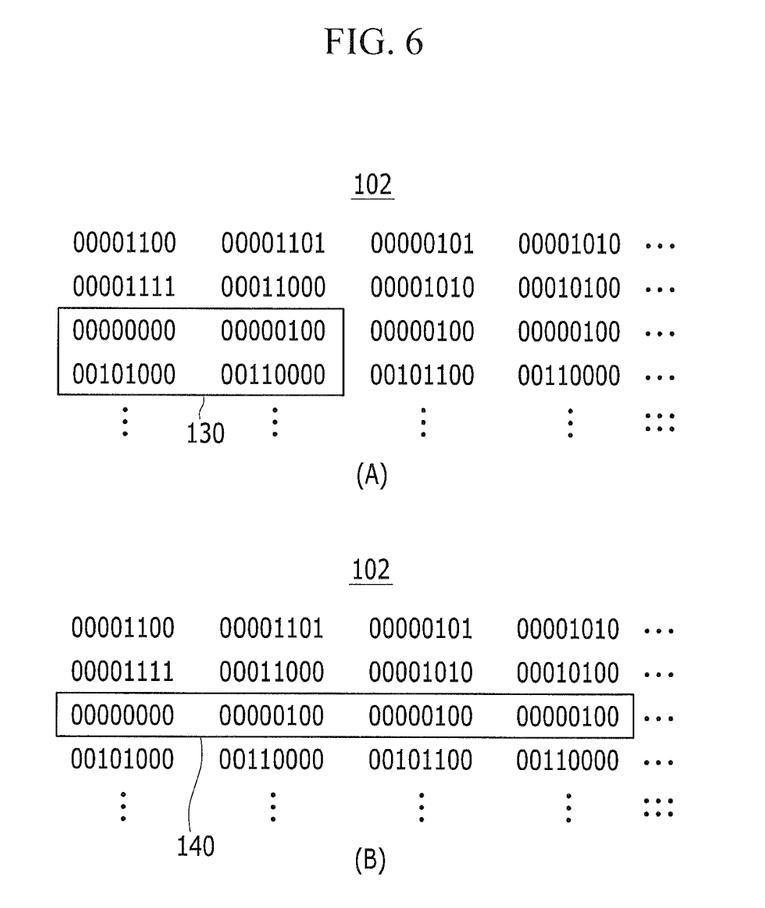
FIG. 6 is a diagram showing a method of determining a shape of a compression unit cell of a data processing method according to an exemplary embodiment of the present invention.

FIG. 6 is a diagram showing a method of determining a shape of a compression unit cell of a data processing method according to an exemplary embodiment of the present invention. Original data 102 of FIG. 6 (A) and FIG. 6 (B) are equal to each other. In addition, it is assumed that the data has a similar value for each row in the original data 102 shown in FIG. 6 (A) and FIG. 6 (B).

If a plurality of data having a similar value is compressed into the stream data, an error between the original data 102 and the data recovering the stream data may be reduced. According to a deviation of the maximum data, the minimum data, and the middle data of the original data 102 compressed to the compression unit cell, the shape of the compression unit cell may be determined.

The compressed middle data of the stream data may be recovered as the average value of the maximum data and the minimum data, or the middle value.

When the difference between the middle data of the original data 102 and the average value of the maximum data and the minimum data or the middle value is small, the error between the original data 102 and the data recovering the stream data is small.

In addition, when the difference between the middle data of the original data 102 and the average value of the maximum data and the minimum data or the middle value is large, the error between the original data 102 and the data recovering the stream data is large.

For example, when compressing four data 0, 1, 2, and 100, the maximum data is 100 and the minimum data is 0. The middle data is recovered to the average value of the maximum value and the minimum value or the middle value. Accordingly, since 1 and 2 are recovered to 50, the error between the original data 102 and the data recovering the stream data is large.

As shown in FIG. 6 (A), when compressing the original data 102 as a first compression unit cell 130 having the 2×2 shape, the controller may group and compress the four data arranged in the 1st and 2nd columns of the 3rd and 4th rows of the original data 102 as the first compression unit cell 130.

If the maximum data cell of the first compression unit cell 130 is 00110000 and the minimum data cell is 00000000, 00000100 and 00101000 of the middle data cell may be compressed into the header field having the flag information 0. The header field having the 0 value of the stream data may be recovered to 00010100 as the average value of the maximum data cell and the minimum data cell or the middle value. Thus, the error between the recovered middle data cell and the middle data cell before the compression may be 00010000 and 00010100.

However, as shown in FIG. 6 (B), the controller may compress the original data 102 into a second compression unit cell 140 having the 1×4 shape. At this time, the maximum value is 00000100 and the minimum value is 00000000 such that 00000100 of the middle data cell may be compressed into the header field having the flag information 0. The header field having the 0 value of the stream data may be recovered to 00000010 as the average value of the maximum data cell and the minimum data cell or the middle value. Thus, the error between the recovered middle data cell and the middle data cell before the compression may be 00000010.

The controller may analyze the value distribution of the original data 102 and may determine the shape of the compression unit cells 130 and 140 according to a plurality of similar data distributions. In the original data 102 shown in FIG. 6 (A) and FIG. 6 (B), the similar data are distributed for each row such that the controller may determine the compression unit cell to be the second compression unit cell 140 of FIG. 6 (B).

Next, a method of recovering the stream data will be described with reference to FIG. 7.

Figure 7:
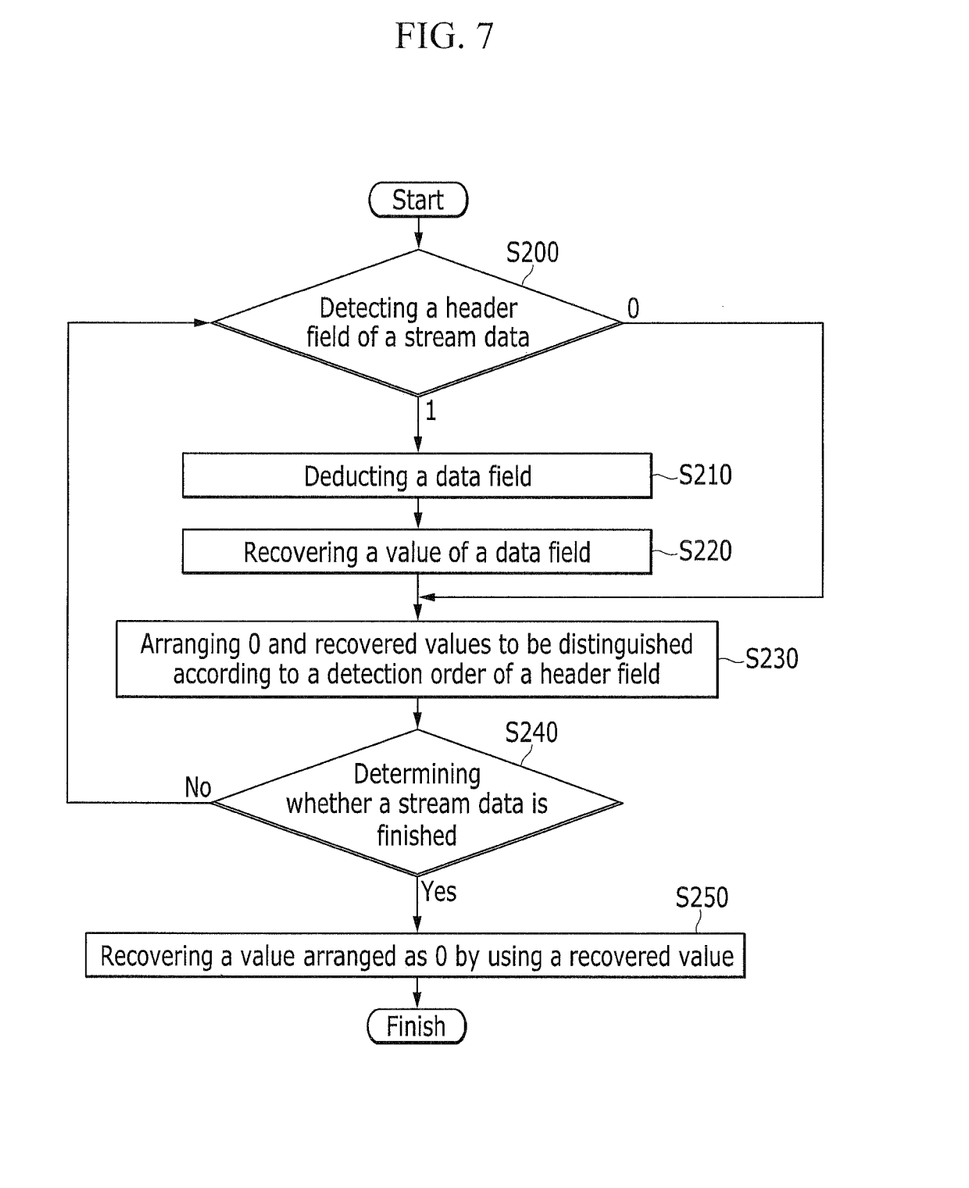
FIG. 7 is a flowchart showing a process of recovering compressed data by a data processing method according to an exemplary embodiment of the present invention.

FIG. 7 is a flowchart showing a process of recovering compressed data by a data processing method according to an exemplary embodiment of the present invention. As shown in FIG. 7, the controller detects the header field of the stream data (S200). For example, the controller may determine whether the bit value of the stream data that is currently detected is 1 or 0.

When the bit value is 1, the controller deducts the data field (S210). The controller may deduct the data field corresponding to the detected header field. For example, the controller may deduct 6 bits arranged after the header field having 1 as the bit value.

Then, the controller recovers the value of the data field (S220). For example, the controller may shift and calculate the value of the data field by 2 bits in the left side. After the shift calculation, the controller additionally performs the calculation of adding (e.g., 00000010) to reduce the error of the recovered value.

In addition, the controller arranges 0 and the recovered value to be distinguished according to the order of the detected header field (S230). The controller may arrange 0 and the recovered value according to the order of the header field to have the shape of the compression unit cell.

Next, the controller determines whether the stream data is finished (S240). The controller may detect the header field of the stream data if the stream data is not finished.

If the stream data is finished, the controller recovers the value arranged as 0 by using the recovered value (S250). The value arranged as 0 may be the average value of the recovered maximum data or minimum data, or the middle value.

Next, referring to FIG. 8, a process of recovering the compressed (e.g., stream) data will be described.

Figure 8:
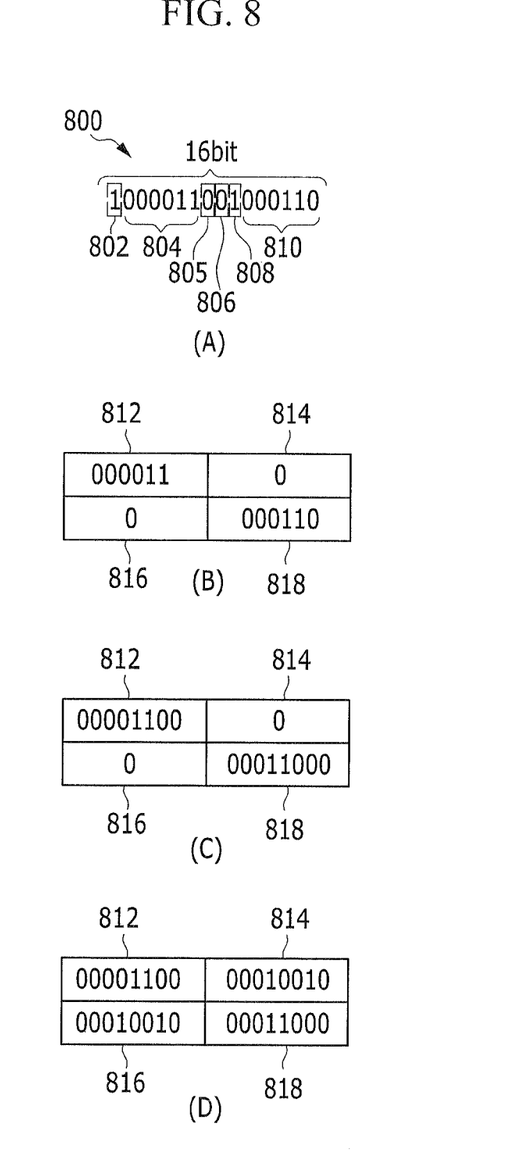
FIG. 8 is a diagram showing compressed data recovered by a data processing method according to an exemplary embodiment of the present invention.

FIG. 8 is a diagram of stream data 800 recovered by a data processing method according to an exemplary embodiment of the present invention. As shown in FIG. 8 (A), the stream data 800 may include a plurality of bits, and the controller may detect a header field 802 of the stream data 800.

Since the value of the initial bit of the stream data 800 is 1, the controller may detect the value of the header field 802 as 1 and may deduct the data field 804 of the detected header field 802. For example, the controller may deduct 6 bits (000011) after the header field 802 (1).

Then, the controller may recover the deducted data field 804 (000011). As shown in FIG. 8 (B), the controller may calculate 000011 by the leftward 2 bit shift.

The controller may arrange the value 00001100 that is shift-calculated according to the detection order of the header field. The controller may arrange the recovered value by considering the shape of the compression unit cell.

For example, the compression unit cell shape of the stream data 800 is 2×2, so the controller may recover the stream data 800 into the data of the 2×2 shape. Hereafter, it is assumed that the stream data 800 is recovered into the data of the 2×2 shape.

Accordingly, the order of the header field 802 that is detected as 1 is the first such that the controller may arrange the recovered value 00001100 at the 1st row and the 1st column, as shown in FIG. 8(C).

Since the stream data 800 is not finished, the controller may detect the header field 805 of the stream data 800. The bit arranged after the data field 804 deducted in the stream data 800 is 0 such that the controller may detect the value of the header field 805 as 0.

In addition, since the order of the header field 805 detected as 0 is the second, the controller may arrange 0 at the 1st row and the 2nd column, as shown in FIG. 8(C).

Since the stream data 800 is not finished, the controller may detect the header field 806 of the stream data 800. The bit arranged after the second header field 805 is 0 such that the controller may detect the value of the header field 806 as 0.

In addition, the order of the header field 806 detected as 0 is the third such that the controller may arrange 0 at the 2nd row and the 1st column, as shown in FIG. 8(C).

Since the stream data 800 is not finished, the controller may detect the header field 808 of the stream data 800. The bit that is arranged next is 1 such that the controller may detect the value of the header field 808 as 1.

The controller may deduct the data field 810 corresponding to the header field 808 detected as 1. For example, the controller may deduct the 6 bits (000110) after the header field 808 (1).

Then, the controller may recover the deducted data field 810 (000110). The controller may shift-calculate 000110 by the left 2 bits. In addition, as shown in FIG. 8 (C), since the order of the header field 808 detected as 1 is the fourth, the controller may arrange the recovered value 00011000 at the 2nd row and the 2nd column (818).

The stream data 800 is finished such that the controller may recover the data 814 and 816 arranged as 0 at the 1st row and the 2nd column and the 2nd row and the 1st column by using the recovered maximum data and minimum data. As shown in FIG. 8 (D), the controller may recover the data 814 and 816 arranged with 0 as the average value of the recovered data.

Hereinafter, referring to FIG. 9 to FIG. 11, a display device for recovering the stream data and using the recovered data through the above-described data processing method will be described.

In the following it is assumed that the described stream data is compressed with information to compensate for deterioration of an organic light emitting diode (OLED). However, the stream data may be data compressed with at least one information piece to drive the display device, and is not limited to the following description.

Figure 9:
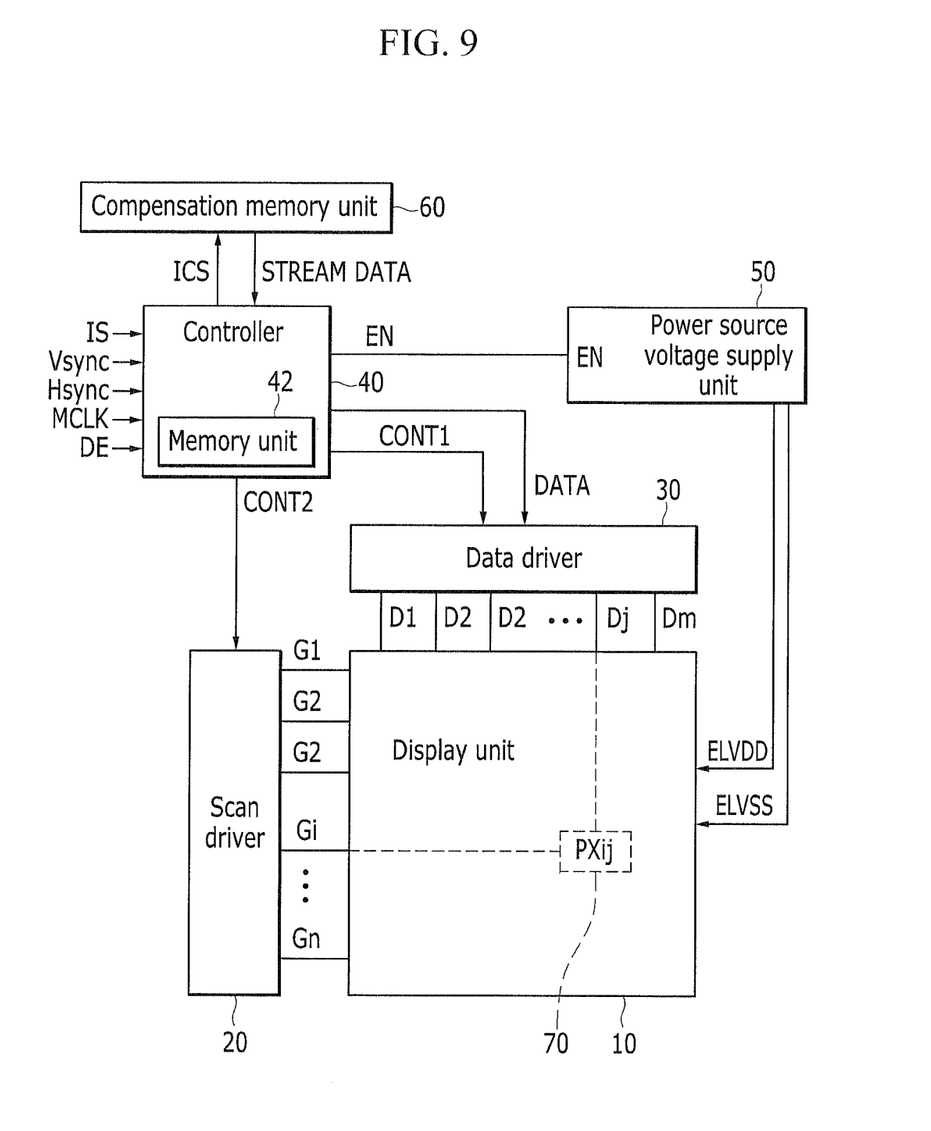
FIG. 9 is a block diagram of a display device according to an exemplary embodiment of the present invention.

FIG. 9 is a block diagram of a display device according to an exemplary embodiment of the present invention. As shown in FIG. 9, a display device includes a display unit 10 including a plurality of pixels 70, a scan driver 20, a data driver 30, a controller 40, a power source voltage supply unit 50, and a compensation memory unit 60 for storing information (hereinafter "deterioration compensation information") to compensate for deterioration of an OLED respectively included in the plurality of pixels 70 as the stream data. Individual pixels may be noted as PX.

The display unit 10 is a display panel including the plurality of pixels 70 connected to corresponding scan lines among a plurality of scan lines S1-Sn and corresponding data lines among a plurality of data lines D1-Dm. The pixels 70 respectively display an image corresponding to an image data signal transmitted to that pixel.

The plurality of pixels 70 included in the display unit 10 are respectively connected to the plurality of scan lines S1-Sn and the plurality of data lines D1-Dm and are arranged in an approximate matrix shape. The plurality of scan lines S1-Sn extend in an approximate row direction and are almost parallel to each other. The plurality of data lines D1-Dm extend in an approximate column direction and are almost parallel to each other. The plurality of pixels 70 of the display unit 100 are respectively supplied with a driving power source voltage from the power source voltage supply unit 50, and a first driving voltage ELVDD and a second driving voltage ELVSS are supplied.

The scan driver 20 is connected to the display unit 10 through the plurality of scan lines S1-Sn. The scan driver 20 generates a plurality of scan signals activating each pixel PX of the display unit 10 according to a scan control signal CONT2 and transmits the scan signals to their corresponding scan lines among the plurality of scan lines S1-Sn.

The scan control signal CONT2 is an operation control signal of the scan driver 20 that is generated by the controller 40 and is transmitted from the controller 40. The scan control signal CONT2 may include a scan start signal SSP and a clock signal CLK. The scan start signal SSP is a signal generating a first scan signal to display the image of one frame. The clock signal CLK is a synchronization signal to sequentially apply the scan signal to the plurality of scan lines S1-Sn.

The data driver 30 is connected to each pixel PX of the display unit 10 through the plurality of data lines D1-Dm. The data driver 30 receives and transmits an image data signal DATA to the corresponding data line among the plurality of data lines D1-Dm according to a data control signal CONT1.

The data control signal CONT1 is an operation control signal of the data driver 30 that is generated by the controller 40 and is transmitted from the controller 40.

The data driver 30 selects a gray voltage according to the image data signal DATA and transmits the selected gray voltage to the plurality of data lines D1-Dm as a data signal.

The controller 40 receives image information IS input from the outside and an input control signal for controlling display of the image data signal DATA. The image information IS includes luminance information of each pixel PX, and the luminance has a grayscale having a predetermined number, for example $1024=2^{10}$, $256=2^{8}$, or $64=2^{6}$.

As examples of the input control signal transmitted to the controller 40, there are a vertical synchronization signal Vsync, a horizontal synchronization signal Hsync, a main clock signal MCLK, and a data enable signal DE.

The controller 40 processes the input image information IS based on the input image information IS and the input control signal to be suitable for an operating condition of the display unit 10 and the data driver 30.

The controller 40 may generate the image data signal DATA through an image processing process such as a deterioration compensation, which is a luminance compensation for the image information IS.

In detail, the controller 40 may generate light emitting time information corresponding to each pixel PX, and may store the generated light emitting time information in a memory unit 42. Next, the controller 40 may generate a deterioration control signal ICS by using the light emitting time information. In addition, according to the deterioration control signal ICS, the controller 40 may deduct deterioration compensation information STREAM DATA stored in the compensation memory unit 60. The controller 40 may generate the image data signal DATA by using the deducted deterioration compensation information STREAM DATA and the image information IS to compensate for the deterioration of the OLED included in each pixel PX.

The controller 40 transmits the scan control signal CONT2 for controlling the operation of the scan driver 20 to the scan driver 20. The signal controller 40 generates the data control signal CONT1 for controlling the operation of the data driver 30 and transmits the data control signal CONT1 to the data driver 30 along with the image data signal DATA that is produced by the aforementioned process.

Next, the controller 40 may control the driving the power source voltage supply unit 50. For example, the controller 40 is connected an EN terminal of the power source voltage supply unit 50 thereby transmitting a driving signal EN.

Thus, the power source voltage supply unit 50 supplies the power source voltage of an internal or external storage device to drive each pixel PX of the display unit 10.

The power source voltage supply unit 50 is electrically connected to each pixel PX through a power source wire supplying the power source voltage to each pixel PX of the display unit 10. The power source voltage may be the first power source voltage ELVDD of a high level, the second power source voltage ELVSS of a low level, or a ground potential.

The compensation memory unit 60 stores deterioration compensation information corresponding to the light emitting time of the pixels 70. For example, the deterioration compensation information means a bit value to be changed to compensate for the deterioration corresponding to the light emitting time.

For example, the compensation memory unit 60 may store a plurality of stream data of which the deterioration compensation information of each pixel PX is compressed corresponding to a pixel light emitting time of 1000 hours.

The controller 40 may generate the image data signal DATA by further considering the deterioration compensation information as well as the image information IS that is currently input when the pixel PX emits light for 1000 hours.

Further, the compensation memory unit 60 selects one stream data among a plurality of stream data corresponding to the deterioration control signal ICS supplied from the controller 40. The detailed description corresponding to this will be described later.

Figure 10:
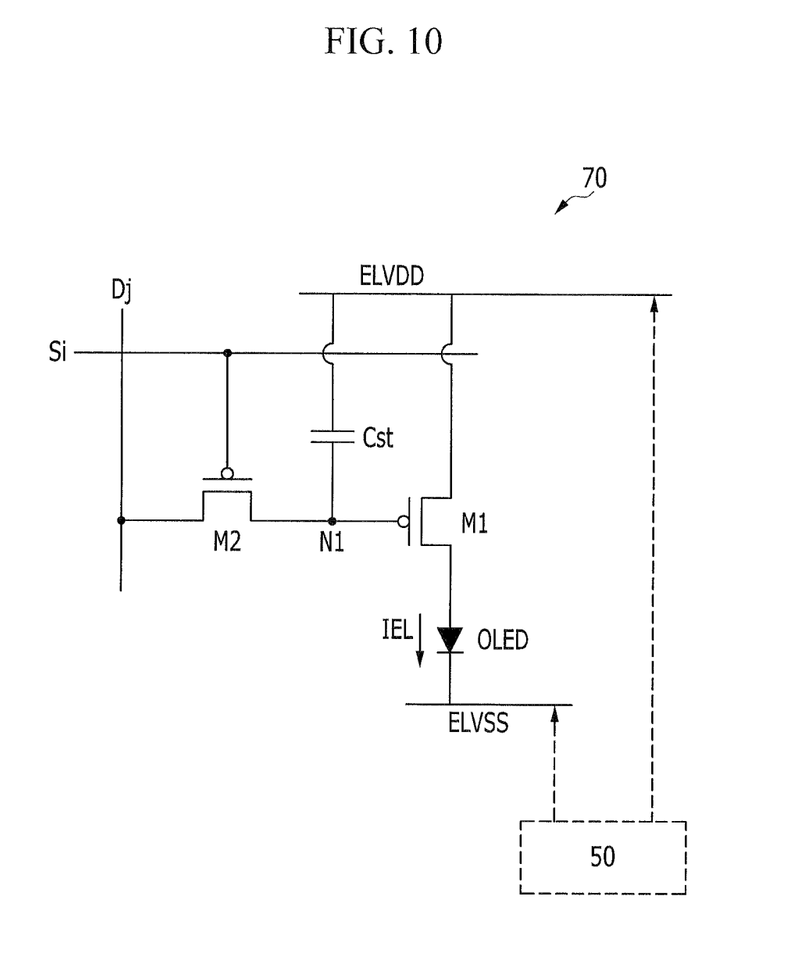
FIG. 10 is a circuit diagram showing an example of a pixel included in a display unit of the display device of FIG. 9.

FIG. 10 is a circuit diagram showing an example of a pixel included in a display unit of the display device of FIG. 9. In detail, among the plurality of pixels 70 included in the display unit 10 of FIG. 9, as a pixel disposed in a crossing region of the i-th scan line Si and the j-th data line Dj, the structure of the pixel PXij connected to the i-th scan line Si and the j-th data line Dj is provided.

Referring to FIG. 10, the pixel 70 includes an OLED as an organic light emitting element, and a pixel driving circuit to control the OLED. The pixel driving circuit includes a driving transistor M1, a switching transistor M2, and a storage capacitor Cst.

In FIG. 10, the pixel 70 includes two transistors and one capacitor, however it is not limited thereto, and the pixel circuit structure of the display device may be variously changed.

In the pixel 70 of FIG. 10, the driving transistor M1 includes a gate electrode connected to a drain electrode of the switching transistor M2, a source electrode connected to the first power source to receive the first power source voltage ELVDD, and a drain electrode connected to an anode of the OLED.

As described above in FIG. 9, the first power source voltage ELVDD is supplied to the source electrode of the driving transistor M1 through the power source wire connected to the power source voltage supply unit 50.

The switching transistor M2 includes a gate electrode connected to the scan line Si, a source electrode connected to the data line Dj, and the drain electrode connected to the gate electrode of the driving transistor M1.

The storage capacitor Cst includes one electrode connected to the gate electrode of the driving transistor M1 and the other electrode commonly connected to the first power source transmitting the first power source voltage ELVDD along with the source electrode of the driving transistor M1. The storage capacitor Cst charges the data voltage according to the data signal applied to the gate electrode of the driving transistor M1 and maintains the charge after the switching transistor M2 is turned off.

The OLED includes the anode connected to the drain electrode of the driving transistor M1 and a cathode connected to the second power source transmitting the second power source voltage ELVSS. As shown in FIG. 10, the second power source voltage ELVSS is supplied to the cathode of the OLED through the power source wire connected to the power source voltage supply unit 50. The second power source voltage ELVSS may be a ground potential.

The driving transistor M1 and the switching transistor M2 forming the pixel 70 of FIG. 10 may be a p-channel field effect transistor (PMOS). Accordingly, a gate-on voltage for turning on the driving transistor M1 and the switching transistor M2 represents a logic low level voltage, and a gate-off voltage for turning the transistors off represents a logic high level voltage. In the pixel 70 of FIG. 10, the transistors are PMOS, however at least one of the transistors may be an n-channel field effect transistor (NMOS).

Accordingly, the data voltage applied to the gate electrode of the driving transistor M1 is lower than the first power source voltage ELVDD transmitted to the source electrode of the driving transistor M1 in the pixel 70 of FIG. 10 such that the driving transistor M1 is turned on, and then a driving current (IEL) corresponding to the data voltage may flow to the OLED. The amount of the driving current (IEL) determines a luminance of the pixel 70 and determines color coordinates of the RGB pixel. In detail, a voltage (Vgs) corresponding to the difference between the gate electrode voltage and the source electrode voltage of the driving transistor M1 is more than a threshold voltage (Vth) of the driving transistor M1, thereby forming a path of the driving current IEL of the OLED.

Referring to the operation of the pixel circuit of FIG. 10, first, if the scan signal corresponding to the gate-on voltage is transmitted to the scan line Si, the switching transistor M2 is turned on and the voltage according to the corresponding data signal is transmitted to a first node N1 through the data line Dj.

Thus, the data voltage is applied to the electrode of the storage capacitor Cst connected to the first node N1 and the first power source voltage ELVDD is applied from the first power source connected to the other electrode of the storage capacitor Cst such that the storage capacitor Cst is charged with the voltage corresponding to the voltage difference between both of its terminals. In other words, the voltage difference applied to both electrodes of the storage capacitor Cst corresponds to the voltage difference applied to the gate electrode and the source electrode of the driving transistor M1 such that storage capacitor Cst stores the voltage (Vgs) between the gate and the source of the driving transistor M1.

If the data voltage applied to the gate electrode of the driving transistor M1 is applied with the low level such that the voltage (Vgs) between the gate and the source of the driving transistor M1 is more than a threshold voltage (Vth) of the driving transistor M1, the driving transistor M1 of the PMOS type is driven such that the path of the driving current IEL is formed, and the OLED generates light corresponding to the driving current IEL. At this time, the data voltage transmitted to the gate electrode of the driving transistor M1 is transmitted through the data driver 30.

Figure 11:
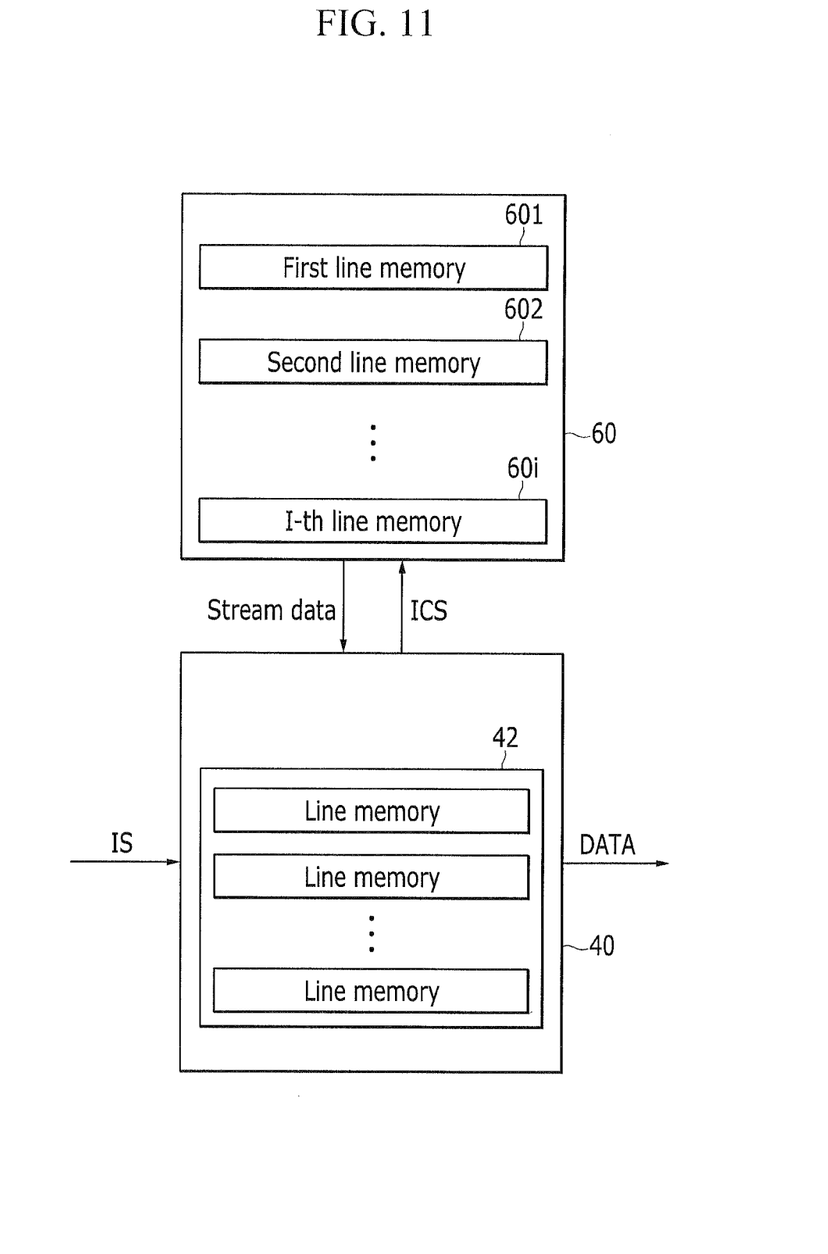
FIG. 11 is a block diagram showing a controller and a compensation memory unit shown in FIG. 9.

FIG. 11 is a block diagram showing the controller 40 and the compensation memory unit 60 shown in FIG. 9, according to an exemplary embodiment of the present invention.

As shown in FIG. 11, the compensation memory unit 60 may include a plurality of memories 601, 602, . . . , 60i. The plurality of memories 601, 602, . . . , 60i may store the stream data of which the deterioration compensation information corresponding to the light emitting time of the pixels 70 is compressed.

Here, the deterioration compensation information corresponding to the light emitting time of the pixels 70 respectively stored in the memories 601, 602, . . . , 60i may be different.

In detail, with reference to a single pixel PX, a reduction ratio of the luminance of the pixel PX corresponding to the light emitting time is set differently by process conditions of the display panel. For example, the change in luminance may be different for the light emitting time of the pixel PX when the resistance of the OLED is changed by the voltage applied to the OLED. Accordingly, in an exemplary embodiment of the present invention, the plurality of memories 601, 602, . . . , 60i may be provided corresponding to the change of a plurality of process conditions.

For example, the first memory 601 may store a bit change value corresponding to the light emitting time when the voltage applied to the OLED is changed by 0.1 V, and the second memory 602 may store the bit change value corresponding to the light emitting time when the voltage applied to the OLED is changed by 0.2 V. In addition, the i-th memory 60i may store the bit change value corresponding to the light emitting time when the voltage applied to the OLED is changed by 0.5 V.

The stream data STREAM DATA stored in one memory among the plurality of memories 601, 602, . . . , 60i corresponding to the deterioration control signal ICS output from the controller 40 may be output to the controller 40.

In addition, the controller 40 recovers the stream data output from the compensation memory unit 60 and stores it in the memory unit 42. The controller 40 may generate the image data signal DATA by using the recovered deterioration compensation information and may output the generated image data signal DATA to the data driver 30.

In detail, if the image information IS is received, the controller 40 may output the deterioration control signal ICS to the compensation memory unit 60 by referring to the light emitting time information stored in the memory unit 42. Further, the controller 40 may generate the image data signal DATA by using the deterioration compensation information of which the stream data output according to the deterioration control signal ICS is recovered and the image information IS, and may output the generated image data signal DATA to the data driver 30.

Further, according to the configuration of the memory unit 42, the shape of the compression unit cell compressing the stream data may be determined. As shown in FIG. 11, the memory unit 42 may include a plurality of line memories.

For example, it is assumed that the deterioration compensation information is arranged in a 16×16 matrix. Although the deterioration compensation information is compressed with the 16 data cell units, according to a number of line memories forming the memory unit 42, the shape of the compressed data cell may be determined to be a combination of shapes, e.g., 1×16, 4×4, and 16×1.

In the case of the 1×16 shape, when storing the recovered deterioration compensation information, the controller 40 may use one line memory. In the case of the 4×4 shape, four line memories are used, and in the case of the 16×1 shape, 16 line memories are used.

According to an exemplary embodiment of the present invention, a data compression ratio may be increased. In addition, according to an exemplary embodiment of the present invention, the compressed data may be easily recovered. Further, according to an exemplary embodiment of the present invention, an image of uniform luminance may be provided.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A data processing method, comprising:
 detecting a maximum data cell having a maximum value and a minimum data cell having a minimum value in a compression unit cell;
 converting the maximum data cell and the minimum data cell into a non-compressed data format;
 converting remaining data cells of the compression unit cell except for the maximum and minimum data cells into a compressed data format;
 generating stream data in which the converted data cells are arranged;
 detecting a first header field from the stream data;
 determining a value of the first header field;
 deducting from a first data field if the value of the first header field corresponds to the non-compressed data format;
 recovering the value of the deducted first data field; and
 arranging the recovered value according to a detection order of the first header field,
 wherein the non-compressed data format and the compressed data format include a header field with different values and the non-compressed data format includes a data field corresponding to the value of the converted maximum or minimum data cell.

2. The data processing method of claim 1, further comprising:
arranging the value of the first header field according to the detection order of the first header field if the value of the first header field corresponds to the compressed data format; and
recovering the arranged first header field by using the recovered value.

3. The data processing method of claim 1, wherein the compression unit cell includes a plurality of data cells arranged in a p×q shape.

4. The data processing method of claim 3, wherein the p is determined according to a distribution of a plurality of data values in original data.

5. The data processing method of claim 3, wherein the p is determined according to a line number of a memory storing the stream data.

6. The data processing method of claim 1, wherein the non-compressed data format includes fewer bits than the maximum or minimum data cells before they are converted.

7. A display device, comprising:
a display unit including a plurality of pixels configured to emit light according to a plurality of data signals;
a data driver configured to transmits the data signals through a plurality of data lines connected to the plurality of pixels;
a power source voltage supply unit configured to supply a driving voltage to drive the plurality of pixels through a power source wire connected to the plurality of pixels;
a compensation memory unit configured to store compensation data of the plurality of pixels and output the compensation data as stream data; and
a controller configured to generate an image data signal by using a received video signal, detect a header field from the stream data, determine a value of the header field, recover a maximum value and a minimum value of the stream data according to the value of the header field, recover middle stream data by using the maximum value and the minimum value, and compensate the image data signal by using the maximum value, the minimum value, or the recovered middle steam data.

8. The display device of claim 7, wherein the controller deducts a data field of the stream data if the value of the header field corresponds to a non-compressed data format, recovers the deducted value of the data field as the maximum value or the minimum value, and arranges the recovered value of the data field according to a detection order of the header field.

9. The display device of claim 7, wherein the controller arranges the value of the header field according to a detection order of the header field if the value of the header field corresponds to a compressed data format.

10. The display device of claim 7, wherein the controller recovers the middle stream data as a middle value of the maximum value and the minimum value or an average value of the maximum value and the minimum value.

11. The display device of claim 7, further comprising a memory unit configured to store the maximum value, the minimum value, or the recovered middle stream data.

12. The display device of claim 7, wherein original data is compressed into the stream data by using a compression unit cell in which a plurality of data cells formed of a plurality of bits are arranged in a shape.

13. The display device of claim 12, wherein the plurality of data cells are arranged in a p×q shape.

14. The display device of claim 13, wherein the p is determined according to a distribution of data values of the original data.

15. The display device of claim 13, wherein the p is determined according to a line number of a memory unit connected with the controller.

16. The display device of claim 7, wherein a non-compressed data format of the maximum and minimum values includes fewer bits than the maximum and minimum values before they are converted.

* * * * *